United States Patent [19]

Robeson

[11] 4,337,330

[45] Jun. 29, 1982

[54] BLENDS OF WATER SOLUBLE POLYETHERS AND POLY(HYDROXYETHERS)S

[75] Inventor: Lloyd M. Robeson, Whitehouse Station, N.J.

[73] Assignee: Union Carbide Corporation, Danbury, Conn.

[21] Appl. No.: 183,068

[22] Filed: Sep. 2, 1980

[51] Int. Cl.$^3$ .................... C08L 63/02; C08L 71/02
[52] U.S. Cl. .................................. 525/407; 525/524; 525/930
[58] Field of Search ..................... 525/407, 524, 930

[56] References Cited

U.S. PATENT DOCUMENTS

| | | | |
|---|---|---|---|
| 3,287,205 | 11/1966 | Bugel | 525/930 |
| 3,431,237 | 3/1969 | Harry | 525/407 |
| 3,655,815 | 4/1972 | Salyer et al. | 525/524 |
| 3,901,846 | 8/1975 | Freed | 525/930 |
| 3,925,504 | 10/1975 | Koleske et al. | 525/930 |

Primary Examiner—Wilbert J. Briggs, Sr.
Attorney, Agent, or Firm—Donald M. Papuga

[57] ABSTRACT

Described herein are blends of water soluble polyethers and poly(hydroxyether)s. These blends are miscible and exhibit controlled extractability and a controlled water dissolution rate.

8 Claims, No Drawings

BLENDS OF WATER SOLUBLE POLYETHERS AND POLY(HYDROXYETHERS)S

Water soluble polyethers, particularly poly(ethylene oxide), are well known commercially available polymers. Poly(ethylene oxide) polymers have molecular weights in the range of from about one hundred thousand to about ten million, and higher. Films, sheets, moldings, and other articles prepared from high molecular weight poly(ethylene oxides) exhibit many desirable and unique features. The resulting articles are tough, inherently flexible, highly extensible, impact resistant and readily soluble in water. Additionally, articles made from poly(ethylene oxide) polymers are resistant to grease, oils, and numerous solvents. In view of the aforementioned features, poly(ethylene oxide) polymers have found extensive uses as water-soluble packaging, films, molded articles, and the like.

However, poly(ethylene oxide) polymers, because of the high molecular weight required for optimum properties, are difficult to injection mold. Further, at high filler loadings, poly(ethylene oxide) containing compositions are especially difficult to process. Thus, it would be desirable to improve the injection molding conditions as well as the processability of poly(ethylene oxide) containing compositions, particularly at high filler loadings.

Additionally, since poly(ethylene oxide) polymers are water soluble, it would be desirable to retard the rate of water solubility or control the water dissolution rate of the polymer in several applications.

Another water soluble polyether, poly(vinyl methyl ether) is an amorphous and rubber polymer unlike poly(ethylene oxide) which is a crystalline and semi-flexible polymer.

The addition of poly(hydroxyether) to water soluble polyethers, such as poly(ethylene oxide) or poly(vinyl methyl ether), yields compositions with controlled extractability and water dissolution rates. Such properties are desirable in applications where controlled release of additives in a wet environment is desired, such as in the following applications: fertilizer release, seed coatings for controlled germination, slow release fungicide, herbicide, or pesticide formulations, friction reduction coatings for maritime vessels, water soluble monofilaments, and the like.

While the water soluble polyethers are miscible with poly(hydroxyether), immediate members of the respective polyethers, i.e., poly(propylene oxide) and poly(vinyl ethyl ether), which are both water insoluble, are not miscible with poly(hydroxyether), and thus do not possess the described advantages of this invention.

DESCRIPTION OF THE INVENTION

It has now been found that the addition of poly(hydroxyether)s to water soluble polyethers, such as poly(ethylene oxide) polymers, improves the ability of the poly(ethylene oxide) to be injection molded. Additionally, it has been found that adding poly(hydroxyether)s to poly(ethylene oxide) polymers allows the addition of higher amounts of filler to the poly(ethylene oxide) polymer while retaining its processability. Further, it has been surprisingly found that the water dissolution rate of the water soluble polyether polymer can be controlled by the addition of the poly(hydroxyether). Thus, such a blend is suitable for use as a water-activated adhesive.

The blend of the present invention comprises:
(a) a water soluble polyether, and
(b) a poly(hydroxyether).

The water soluble polyether polymers suitable for use herein include at least one of a poly(ethylene oxide) or a poly(vinyl methyl ether) polymer.

The poly(ethylene oxide) polymers are well known and commercially available. They are prepared by methods well known in the art and as found in, for example, U.S. Pat. No. 3,417,064. The poly(ethylene oxide) polymers suitable for use herein include interpolymers and copolymers which contain the ethylene oxide as one of the monomeric constituents. The copolymers of ethylene oxide are prepared by reacting ethylene oxide and other comonomers, such as oxirane compounds, i.e., styrene oxide, propylene oxide or butylene oxide, and the like. These copolymers are prepared using various ionic catalysts well known in the art.

Interpolymers containing ethylene oxide as one of the monomeric constituents are prepared by copolymerizing ethylene oxide with one or more vinyl monomers as described in U.S. Pat. No. 3,763,277, by the methods as described therein. These monomers include N,N-dimethylaminoethyl methacrylate, styrene, methyl methacrylate, 2-methyl-5-vinyl pyridine, acrylonitrile, hydroxyethyl methacrylate, acrylic acid, acrylamide, and the like.

Poly(vinyl methyl ether) polymers are well known in the art and are described in, for example, "Encyclopedia of Polymer Science & Technology," Interscience Publishers, New York, 1971, Vol. 14, pages 511 to 521. The poly(vinyl methyl ether) polymers as used herein include both the water soluble homopolymer as well as water-soluble copolymers and terpolymers or mixtures thereof. The copolymers and terpolymers are produced by copolymerizing the vinyl ether with at least one monomer, such as acrylonitrile, maleic anhydride, styrene, and the like, by methods well known in the art and as described, for example, on pages 516 and 517 of the above-identified publication. The copolymers include poly(methyl vinyl ether-co-maleic anhydride), the half-amide of poly(methyl vinyl ether-co-maleic anhydride), and the like. These copolymers are commercially available.

The poly(hydroxyether)s which may be used herein have the following general formula:

$$[A-O-D-O]_n$$

where A is the radical residuum of a dihydric phenol, D is a radical residuum of an epoxide selected from mono- and diepoxides and which contain from 1 to 2 hydroxyl groups, and n is an integer which represents the degree of polymerization and is at least about 20 and preferably is above about 70.

In general, thermoplastic poly(hydroxyether)s are prepared by contacting, under polymerization conditions, a dihydric phenol and an epoxide containing from 1 to 2 epoxide groups in substantially equimolar amounts by methods well known in the art.

The product produced by the reaction between bisphenol-A and epichlorohydrin has the repeating unit

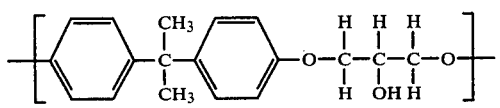

and can be terms a poly(monohydroxyether) of bisphenol-A.

The product produced by the reaction between hydroquinone and butadiene dioxide has the repeating unit

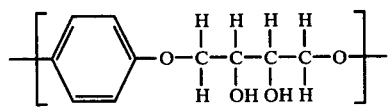

and can be termed a poly(dihydroxyether) of hydroquinone.

By the use of both a monoepoxide and a diepoxide poly(hydroxy-dihydroxyethers) can be obtained, the relative amounts of mono- and diepoxide determining the final concentration of the mono- and dihydroxy containing repeating units E″ in the polymer.

Any dihydric phenol can be used in forming poly(hydroxyether)s. Illustrative dihydric phenols are mononuclear dihydric phenols such as hydroquinone, resorcinol, and the like as well as the polynuclear phenols. The dihydric polynuclear phenols have the general formula:

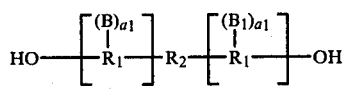

wherein $R_1$ is an aromatic divalent hydrocarbon radical, such as naphthylene and phenylene with phenylene being preferred, B and $B_1$ may be the same or different and are selected from alkyl radicals, such as methyl, n-propyl, n-butyl, t-butyl, n-hexyl, n-octyl and the like, preferably alkyl radicals having 1 to 4 carbon atoms; halogen atoms, i.e., chlorine, bromine, iodine, or fluorine; or alkoxy radicals such as methoxy, methoxymethyl, ethoxy, ethoxyethyl, n-butyloxy, amyloxy and the like, preferably an alkoxy radical having 1 to 4 carbon atoms, a and $a_1$ are independently integers of 0 to 4, $R_2$ is alkylene, alkylidene, cycloalkylene or a saturated divalent group. Particularly preferred are dihydric polynuclear phenols having the general formula:

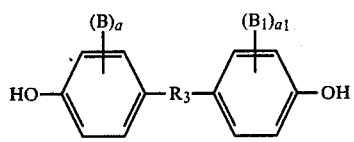

wherein B, $B_1$, a and $a_1$ are as previously defined, and $R_3$ is an alkylene or alkylidene group, preferably having from 1 to 3 carbon atoms, or cycloalkylene having 6 to 12 carbon atoms. Preferably, $R_3$ is

Diepoxides useful for the preparation of polyhydroxyethers may be represented by repeating units of the following formula

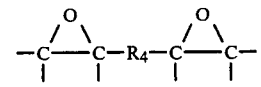

wherein $R_4$ is representative of a bond between adjacent carbon atoms or a divalent organic radical such as an aliphatic, aromatic, cyclic, heterocyclic or acyclic arrangement of atoms.

By the term "diepoxide" is meant a compound containing two epoxide groups i.e. groups containing an oxirane oxygen atom bonded to two vicinal aliphatic carbon atoms. Saturated diepoxides in which both the oxirane oxygen atoms are bonded to carbon atoms of a saturated aliphatic hydrocarbon chain are particularly preferred. The term "saturated diepoxides" refers to diepoxides which are free of ethylenic unsaturation, i.e. —C=— and acetylenic unsaturation, i.e. —C≡—. Diepoxides which contain solely carbon, hydrogen and oxygen atoms are especially preferred. The oxygen atoms can be (in addition to oxirane oxygen), ether oxygen, i.e. —O— oxacarbonyl oxygen, i.e.

$$-\overset{\overset{O}{\|}}{C}-O-$$

carbonyl oxygen, i.e.

and the like. A single diepoxide or a mixture of at least two diepoxides can be employed in preparing the polydihydroxyethers of the present invention and the term "diepoxide" is intended to include a mixture of at least two diepoxides.

Other diepoxides include ethers wherein the oxirane oxygens are connected in epoxy groups wherein the carbon atoms are a part of a branched or straight chain aliphatic hydrocarbon such as bis(2,3-epoxy-2-ethylhexyl) ether, diglycidyl ether, diglycidyl Cellosolve, bis(2,3-epoxybutyl) ether, bis(2,3-epoxy-2-methylpropoxyl)-ethane, 2,3-epoxybutyl-2-methylglycidyl ether, di(2-methylglycidyl) carbitol, bis(2-neopentylglycidyl)-ether, glycidyl-(2,3-epoxypropoxy)propionate, bis(2,3-epoxy-5,5,7,7-tetramethyloctyl) ether, bis(glycidyl Cellosolve) maleate, and the like.

Other diepoxides which can be mentioned include those wherein the two oxirane groups are linked through an aromatic ether, i.e., compounds having the grouping

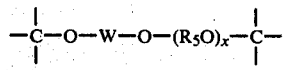

wherein $R_5$ is a divalent organic radical, W is a divalent aromatic radical residuum of a dihydric phenol such as those listed above in the description of dihydric phenols, and x is an integer from 0 to 1 inclusive.

Still other diepoxides include ethers wherein the oxirane groups are connected to vicinal carbon atoms at least one pair of which is part of a cycloaliphatic hydrocarbon.

The preferred diepoxides are those wherein each of the oxirane groups is connected to an electron donating substituent which is not immediately connected to the carbon atoms of that oxirane group. These diepoxides have both of the oxirane groups corresponding to the formula

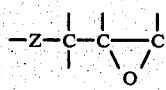

wherein Z is an electron donating substituent such as

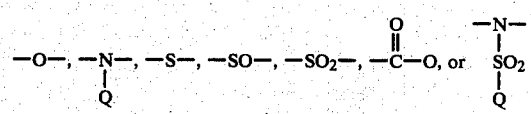

and Q is a saturated hydrocarbon radical, is saturated as defined aove, e.g. an alkyl, cycloalkyl, aryl or aralkyl group.

Among suitable epihalohydrins and mixtures thereof which with epoxides can be reacted with dihydric phenols to produce the thermoplastic polyhydroxyethers used herein are those having the general formula:

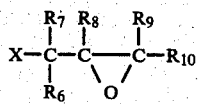

wherein $R_6$, $R_7$, $R_8$, $R_9$, and $R_{10}$ which can be the same or different are hydrogen or organic radicals such as alkyl, cycloalkyl, aryl, alkylene and arylene and X is halogen i.e., chlorine, bromine, and the like. Specific epihalohydrins are epichlorohydrin, epibromohydrin, 1,2-epoxy-1-methyl-3-chloropropane and 1,2-epoxy-2-methyl-3-chloropropane.

The preferred dihydric phenol is bisphenol A. The preferred epoxides include the following:

diethylene glycol bis(3,4-epoxycyclohexanecarboxylate),
2-ethyl-1,3-hexanediol bis(3,4-epoxycyclohexanecarboxylate),
diethylene glycol bis(3,4-epoxy-6-methylcyclohexanecarboxylate),
3-methyl-1,5-pentanediol bis(3,4-epoxycyclohexanecarboxylate),
3-methyl-1,5-pentanediol bis(3,4-epoxy-2 or 3 or 4 methylcyclohexanecarboxylate),
triethylene glycol bis (3,4-epoxycyclohexanecarboxylate),
1,5-pentanediol bis (3,4-epoxycyclohexanecarboxylate),
2-methoxymethyl-4-dimethyl-1,5-pentanediol bis(3,4-epoxycyclohexanecarboxylate),
ethylene glycol bis(3,4-epoxycyclohexanecarboxylate),
ethylene glycol bis(3,4-epoxy-6-methylcyclohexanecarboxylate),
2-ethylhexane-1,3-diol glutarate, 3,4-epoxycyclohexanecarboxylate),
"Carbowax 400" bis(6-methyl-3,4-epoxycyclohexanecarboxylate),
"Carbowax 1000" bis(6-methyl-3,4-epoxycyclohexanecarboxylate),
"Polypropylene glycol 2025" bis(6-methyl-3,4-epoxycyclohexanecarboxylate),
2-ethylhexane-1,3-bis(6-methyl-3,4-epoxycyclohexanecarboxylate),
2,2'-sulfonyldiethanol bis(3,4-epoxycyclohexanecarboxylate),
1,6-hexanediol bis(3,4-epoxycyclohexanecarboxylate).

The most preferred poly(hydroxyether)s are prepared from bisphenol-A and epihalohydrin, particularly epichlorohydrin.

These poly(hydroxyether)s are prepared by methods well known in the art, such as those described in, for example, U.S. Pat. Nos. 3,238,087; 3,305,528; 3,294,747 and 3,277,051.

In the blends of this invention, the water soluble polyether is present in amounts of from about 2 to about 96, preferably from about 5 to about 90 weight percent, and the poly(hydroxyether) is present in amounts of from about 4 to about 98, and preferably from about 10 to about 95 weight percent.

Other additives may be included in the blends of this invention. These additives include plasticizers; pigments; flame retardant additives, particularly, decabromodiphenyl ether and triarylphosphates, such as triphenylphosphate; reinforcing agents, such as glass fibers; fillers, such as, calcium carbonate; thermal stabilizers; oxidative stabilizers, such as phenothiazine, processing aids, impact modifiers, pesticides, fungicides, herbicides and the like. Additionally, surfactants such as ethoxylated nonylphenols may be included herein. These surfactants are of the following formula:

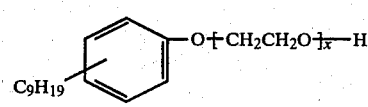

wherein x is from about 4 to about 40. These materials are commercially available as Tergitol (made by Union Carbide Corporation).

The blends of this invention are prepared by any of the conventional mixing methods. For example, a preferred method comprises mixing the water soluble polyether and poly(hydroxyether) in powder or granular form in an extruder and extruding the mixture into strands, chopping the strands into pellets and molding the pellets into the desired article.

EXAMPLES

The following examples serve to give specific illustrations of the practice of this invention but they are not intended in any way to limit the scope of this invention.

EXAMPLES 1 TO 12

In these Examples, a poly(hydroxyether) which is the reaction product of bisphenol-A and epichlorohydrin (having a reduced viscosity of 0.43 dl/g measured as 0.2 g/100 ml in tetrahydrofuran at 25° C., PKHH sold by Union Carbide Corporation) was blended with a poly(ethylene oxide) having a molecular weight of about 4,000,000 and a solution viscosity range of from 1,650 to 3,850 centipoise measured as a one percent solution in water at 25° C. in a Brookfield viscometer (spindle No. 1, speed of 2 revolutions per minute) [WSR-301 sold by Union Carbide Corporation]. These polymers were blended in a Brabender blender at from 180° to 200° C. in the ratios as shown in Table I. The glass transition temperature (Tg) of the blend was measured by a dynamic mechanical method using a torsion pendulum as described in L. E. Nielsen, Mechanical Properties of Polymers, Van Nostrand-Reinhold, Princeton, N.J. Control A was the poly(hydroxyether) and Control B was the poly(ethylene oxide).

The results are shown in Table I.

The data in the Table shows that the poly(ethylene oxide) and poly(hydroxyether) are miscible over the entire composition range. The blends exhibited miscibility as single glass transition values were obtained for both the amorphous and crystalline versions of the blend.

TABLE I

| Example | Ratio of Poly(hydroxy-ether) to Poly(ethylene oxide) | Tg (°C.) Amorphous | Tg (°C.) Crystalline |
|---|---|---|---|
| Control A | 100/0 | 94 | — |
| 1 | 90/10 | 66 | — |
| 2 | 80/20 | 46 | — |
| 3 | 70/30 | 24 | — |
| 4 | 65/35 | 15 | 39 |
| 5 | 60/40 | 6 | 40 |
| 6 | 55/45 | −5 | 43 |
| 7 | 50/50 | −16 | 45 |
| 8 | 45/55 | −25 | 43 |
| 9 | 40/60 | −27 | 36 |
| 10 | 35/65 | −37 | 34 |
| 11 | 25/75 | −47 | 20 |
| 12 | 15/85 | — | 10 |
| Control B | 0/100 | — | −57 |

EXAMPLES 13 TO 16

The poly(hydroxyether) and poly(ethylene oxide) polymers as described in Examples 1 to 12 were blended in an extruder at about 150° C. in the ratios shown in Table II. The blend was then compression molded at 150° C. into thirty mil thick plaques. Samples were cut from the plaques and immersed in water at a temperature of about 25° C. for thirty days. The water sorption was then measured. The percent water sorption, i.e., the percent based on final dry weight, was determined. Also, percent extractables of the product was determined by weighing the final dry product after immersion testing was completed.

The results are shown in Table II.

TABLE II

| Example | Ratio of poly(hydroxyether) to poly(ethylene oxide) | Water Content (percent) | Extractables (percent) |
|---|---|---|---|
| 13 | 60/40 | 60.5 | 12.5 |
| 14 | 50/50 | 109 | 19.1 |
| 15 | 40/60 | 187 | 35.9 |
| 16 | 25/75 | 330 | 59.1 |

The data in Table II show that the extraction of poly(ethylene oxide) from the blend is not complete and the residual product exhibits the capability of absorbing large quantities of water, i.e., hydrogel type character. It is pointed out that poly(ethylene oxide) dissolves completely under the same test procedures.

EXAMPLE 17

Seventy-five weight percent of the poly(hydroxyether) described in Examples 1 to 12 was blended with 22.5 weight percent of poly(ethylene oxide) and 2.5 weight percent of Tergitol NP-33 (the reaction product of nonylphenol ethoxylate and 33 moles of ethylene oxide, sold by Union Carbide Corporation) in a Brabender blender at 180° to 200° C. The resultant blend was transparent and exhibited a single glass transition temperature of 30° C. (as measured by the procedure as described in Examples 1 to 12). The blend was tested for the following physical properties: 1 percent secant modulus according to a procedure similar to ASTM D-638; yield strength according to ASTM D-638; Tensile strength and yield elongation according to ASTM D-638; Elongation at break according to ASTM D-638; and Pendulum impact strength according to the procedure described in U.S. Pat. No. 3,657,385, which is incorporated herein.

TABLE III

| | |
|---|---|
| 1 percent secant modulus (psi) | 59,000 |
| Yield strength (psi) | 1,090 |
| Tensile strength (psi) | 1,090 |
| Yield elongation (%) | 6 |
| Elongation at break (%) | 231 |
| Pendulum impact strength (ft-lbs/in$^3$) | 118 |

The data in Table III shows that the addition of poly(ethylene oxide) to the poly(hydroxyether) plasticizes the poly(hydroxyether) since the 1 percent secant modulus of unblended poly(hydroxyether) is 260,000 psi while the blend of poly(hydroxyether) and poly(ethylene oxide) has a 1 percent secant modulus of 59,000.

CONTROL C

A blend of 90 percent of poly(ethylene oxide), described in Examples 1 to 12 and 10 percent of Tergitol NP-33 (an ethoxylated nonylphenol) was injection molded in a 1½ ounce Newbury injection molding machine. The molding conditions are shown in Table IV. The poly(ethylene oxide) was tested to determine the following physical properties: percent elongation, tensile modulus and tensile strength according to ASTM D-638.

The results are shown in Table IV.

EXAMPLE 18

Seventy-five weight percent of Control C was blended with 25 weight percent of poly(hydroxyether) [PKHH] in a 1 inch extruder at about 150° C. The product was then injection molded in a 1½ ounce Newbury molding machine. The molding conditions are shown in Table IV. The blend was tested for the physical properties as described in Control C.

The results are shown in Table IV.

EXAMPLE 19

Sixty-weight percent of the blend of Example 18 was blended with 40 weight percent of calcium carbonate filler in a 1 inch extruder at about 150° C. The product was then injection molded in a 1½ ounce Newbury molding machine. The molding conditions are shown in Table IV. The blend was tested for the physical properties as described in Control C.

The results are shown in Table IV.

The data in Table IV show that the addition of poly(hydroxyether) to poly(ethylene oxide) improves processability by allowing injection molding to be conducted at lower temperatures. The properties of poly(ethylene oxide) are not impaired by the addition of poly(hydroxyether). Addition of the poly(hydroxyether) allows the use of high filler loading in the poly(ethylene oxide).

TABLE IV

| Example | Molding Conditions | | | | | | Physical Properties | | |
|---|---|---|---|---|---|---|---|---|---|
| | Temperatures (°F.) | | | | Injection pressure | | Elongation | Tensile Modulus | Tensile Strength |
| | Rear | Front | Nozzle | Mold | (psi) | RPM | (%) | (psi) | (psi) |
| Control C | 300 | 360 | 360 | 60 | 700 | 120 | 628 | 46,800 | 1,160 |
| 18 | 300 | 320 | 320 | 30 | 800 | 130 | 642 | 39,400 | 1,000 |
| 19 | 300 | 330 | 330 | 30 | 1000 | 120 | 379 | 66,000 | 1,070 |

EXAMPLE 20

A poly(vinyl methyl ether) [M-556 sold by General Aniline & Film] was devolatilized prior to mixing with a poly(hydroxyether) [PKHH]. 25 weight percent of the poly(vinyl methyl ether) was blended with 75 weight percent of the poly(hydroxyether) in a Brabender blender at 170° to 190° C. The resultant mixture was opaque at processing temperatures; however, it became transparent when cooled to room temperature. The mixture was compression molded at 140° C. into a 20 mil sample and then tested, after conditioning for one day at 25° C. and 50 percent relative humidity, for the following physical properties: secant modulus, tensile strength and elongation, by the procedures as described in Example 17. Also, the glass transition temperature was measured by the resilience technique as described in Olabisi, et al., Polymer-Polymer Miscibility, Academic Press, New York, 1979, page 126.

The results are shown in Table V.

TABLE V

| 1% Secant Modulus (psi) | 264,000 |
|---|---|
| Tensile Strength (psi) | 6,250 |
| Elongation at Break (%) | 94 |
| Tg (°C.) | 50 |

The resultant transparent blend exhibits a single glass transition temperature intermediate between the constituents and is therefore considered to be a miscible blend.

EXAMPLES 21 TO 27

Poly(vinyl methyl ether) [M556 as described in Example 20] was blended with a poly(hydroxyether) [PKHH] in the proportions as shown in Table VI. The poly(vinyl methyl ether) was devolatilized from the toluene solution as received. The polymers were blended in a Brabender blender at 150° to 180° C. The blend was then compression molded at 140° to 160° C. Control A was the poly(hydroxyether). Control C was the poly(vinyl methyl ether). All the blends were transparent.

The glass transition temperature of the blends and the Controls was measured by the procedure as described in Examples 1 to 12.

The results are shown in Table VI.

TABLE VI

| Example | Ratio of poly(hydroxyether) to poly(vinyl methyl ether) | Tg (°C.) |
|---|---|---|
| Control A | 100/0 | 94 |
| 21 | 90/10 | 75 |
| 22 | 80/20 | 63 |
| 23 | 60/40 | 38 |
| 24 | 50/50 | 28 |
| 25 | 40/60 | 17 |
| 26 | 25/75 | 0 |
| 27 | 10/90 | −19 |
| Control C | 0/100 | −27 |

The data in Table VI show that the blends exhibit Tg values which are between those of the constituent polymers. This indicates that poly(vinyl methyl ether) and poly(hydroxyether) are miscible over the entire range.

EXAMPLE 28

The blend of Example 23 was compression molded at 140° to 160° C. into 30 mil thick plaques. The plaques were immersed in water at 25° C. for 7 days. The weight percent of weight sorption based on final dry weight and the percent extractables of the plaques were measured by the procedure as described in Examples 13 to 16.

The results are shown in Table VII.

EXAMPLE 29

The blend of Example 25 was compression molded at 140° to 160° C. into 30 mil thick plaques. The plaques were immersed in water at 25° C. for 7 days. The weight percent of water sorption based on final dry weight and the percent extractables of the plaques were measured by the procedure as described in Examples 13 to 16.

The results are shown in Table VII.

TABLE VII

| Example | Ratio of poly(hydroxyether) to poly(vinyl methyl ether) | Water sorption (%) | Extractables (%) |
|---|---|---|---|
| 28 | 60/40 | 2.1 | 0.0090 |
| 29 | 40/60 | 37.4 | 0.041 |

What is claimed is:
1. A composition comprising a blend of:
(i) a water soluble poly(ethylene oxide), and

(ii) a thermoplastic poly(hydroxyether) having the general formula:

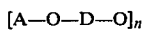

wherein A is a radical residuum of a dihydric phenol, D is a radical residuum of an epoxide selected from mono- and diepoxides and which contain from 1 to 2 hydroxyl groups, and n is an integer which is at least about 20.

2. A composition as defined in claim 1, wherein the poly(hydroxyether) is the product obtained by the reaction of bisphenol-A and epichlorohydrin.

3. A composition as defined in claim 1, which contains from about 2 to about 96 weight percent of the water soluble poly(ethylene oxide).

4. A composition as defined in claim 3, which contains from about 5 to about 90 weight percent of the poly(ethylene oxide).

5. A composition as defined in claim 1, which contains from about 4 to about 98 weight percent of the poly(hydroxyether).

6. A composition as defined in claim 5 which contains from about 10 to about 95 weight percent of the poly(hydroxyether).

7. A composition as defined in claim 1 which contains an ethoxylated nonylphenol.

8. A composition as defined in claim 1 which contains a filler.